May 2, 1950
J. A. SPENCER
2,506,000
TAPE REPERFORATOR
Filed Oct. 1, 1946
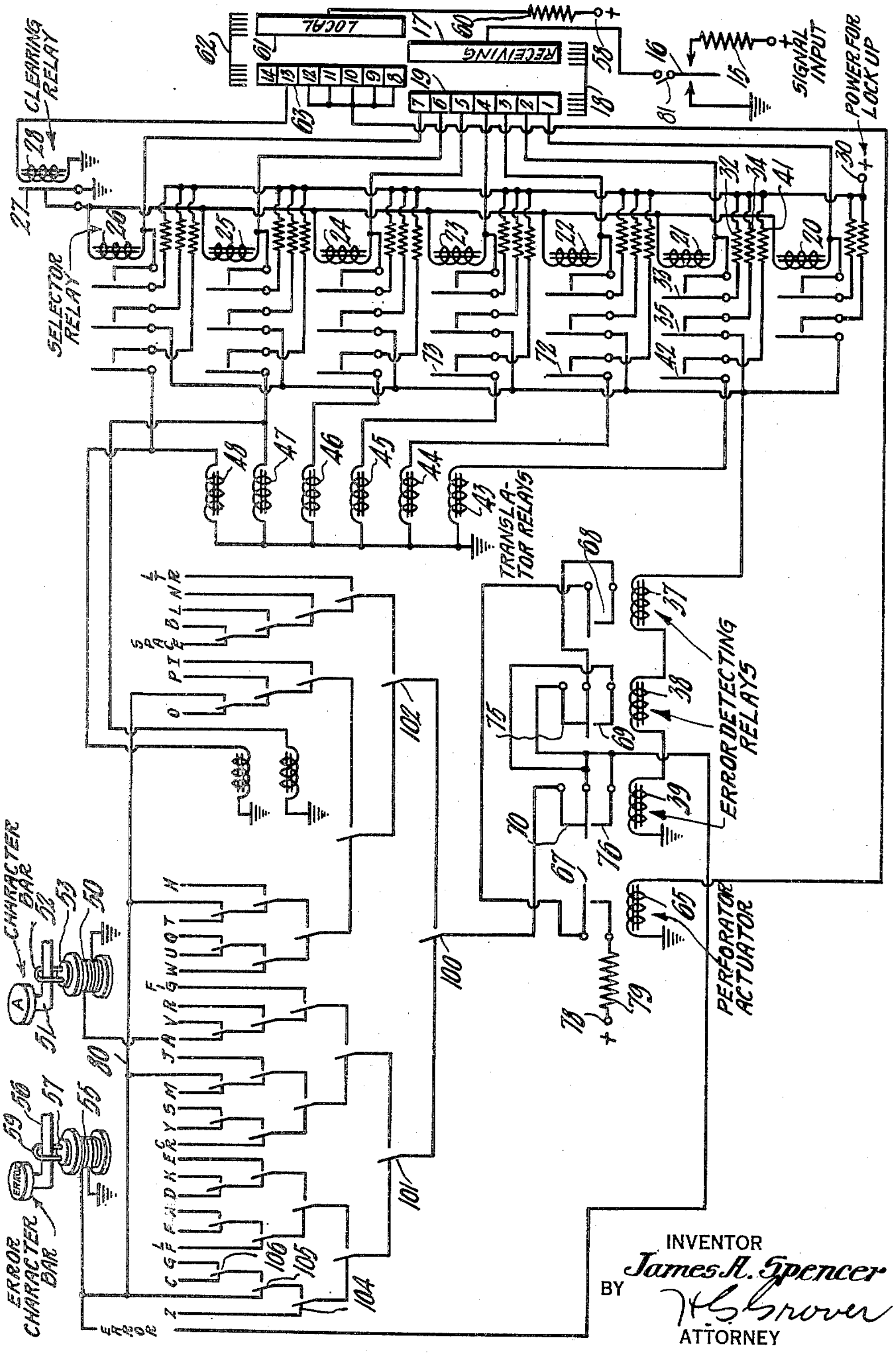
INVENTOR
James A. Spencer
BY H. G. Grover
ATTORNEY Patented May 2, 1950 2,506,000

UNITED STATES PATENT OFFICE 2,506,000

TAPE REPERFORATOR

James A. Spencer, Teaneck, N. J., assignor to Radio Corporation of America, a corporation of Delaware Application October 1, 1946, Serial No. 700,410

19 Claims. (Cl. 164—113)

This invention relates to telegraph apparatus and more particularly to an improved device for perforating a paper tape in response to received code signal impulses.

In modern telegraphic practice it is often desirable to produce from incoming signals a paper tape having perforations therein corresponding to the incoming signals whereby the perforated tape thus produced may be used for retransmission or monitoring purposes. Particularly is this true at terminal stations where incoming signals are received by radio and distributed over land lines. The benefits of the present invention, although not limited thereto, are readily adaptable for use in conjunction with such a system.

Telegraph code signals are especially susceptible to distortion and to mutilation when transmitted by radio channels. Transmission phenomena such as static and fading may give rise to false signals. It is desirable to provide means for detecting instances of mutilation of the received code signals and to provide means whereby the perforator will punch a special code group indicative of an error.

In carrying out the invention it is preferred to make use of a signalling code having equal intervals for each character and having preferably seven or eight time intervals allotted to each code signal so that a fixed number of marking time impulses may be maintained independently of the character designation for each code signal. A code signal system in which the signals are of equal length and possess a fixed ratio other than one to one between the number of marking and spacing units thereof is disclosed in a Reissue Patent No. 22,394, patented November 23, 1923, by John B. Moore et al.

Tape perforators which are operated manually through a keyboard are well known in the art. Such a perforator is shown in the patent to Gill, No. 751,161, issued February 2, 1904. In order to eliminate unnecessary duplication of equipment, the present invention is designed for use with such a perforator without interferring with its normal manual operation.

It is an object of this invention to provide a tape re-perforator for operation directly from a multiplex receiving distributor and at the same time provide for manual operation without disconnecting or removing the unit from its normal position.

A further object of the invention is to detect, and indicate by perforating in the tape a specific code signal, any malformation in the received code signal.

Briefly, in accordance with the invention, incoming signals having equal intervals for each character and having a fixed number of marking elements are conducted to the distributor face plate of a standard multiplex receiver. A group of selector relays are used to store the received signals. These relays establish circuits comprising an error detector and also control a group of translator relays. The translator relays are equipped with contacts which are so connected that by operating various groups of these relays, circuits are established from a source of operating power to the solenoids which operate the perforator. The error detector operates to conduct the operating power to a solenoid on the perforator which causes a special error indicating code group to be punched whenever a mutilated signal is received. Provision is also made so that the error indicating solenoid will be actuated upon the reception of signals having the requisite number of marking elements but which have not been assigned to characters representing signal intelligence. That is, any combinations having the requisite number of marking elements which are required for conveyance of intelligence either as alphabetical characters or as apparatus function signals, in other words null-code signals, will also actuate the error indicating solenoid.

The above and other objects and advantages will become apparent upon a consideration of the following detailed description when taken in conjunction with the accompanying drawing schematically illustrating a preferred embodiment of the invention.

Referring to the drawing, the signalling circuit is traced from power input through resistor 15, relay tongue 16, solid ring 17, brushes 18, commutating segments 1 through 7 of commutator ring 19, and thence through the windings of selector relays 20 through 26, and contact elements 27 of clearing relay 28 to ground.

The selector relays operate in response to signals through impulses received during the mark intervals of the received code character and are locked up by power from a local source 30. The lock-up circuit is identical for relays 20 through 26 and will only be described in connection with the operation of relay 21. This circuit may be traced from the source of power 30 through resistor 32, contacts 33, the winding of relay 21, and contacts 27 of relay 28 to ground.

The selector relays 21 through 26 also complete circuits for controlling the translator relays 43 through 48 and error detecting relays 37, 38, 39. It will be noted that no translator relay is actuated by selector relay 20. The purpose of this omission will appear later. The circuit for actuating these relays will be described with respect to relay 21 only, the operation of the remaining relays being similar. The local source of power 30 is conducted through resistor 34 to contacts 35 and thence through the serially connected winding of relays 37, 38, 39 to ground. The same source of power is also conducted through resistor 41 to contacts 42 and thence through translator relay winding 43 to ground.

The translator relays 43 through 48 are equipped with "pile-ups" which are so connected that by operating various groups of these relays paths are established from the tongue of translator relay 43 to the various output circuits. Such translators are old in the art and consist of a single tongue contact 100 thrown to the left or right by relay 43 and a pair of contacts 101 and 102 similarly actuated by relay 44. Relays 45, 46, 47 and 48 actuate similar banks of contacts in order, in increasing number, to establish the requisite paths to the translator. Thus, if translator relays 46, 47 and 48 operate, a circuit is completed through contacts 100, 101, 103, 104, 105 and 106 to output G.

Error detector relay 37 is adjusted to operate on a current strength equal to the value passed through one resistor, such as resistor 34. Error detector relay 38 is adjusted to operate on a current strength a multiple of that value, and error detector relay 39 is adjusted to operate on a current strength greater than that required to operate relay 38.

The output circuits from the "pile-ups" of relays 43 through 48 are connected to solenoids which actuate the character bars of a standard perforator. One such solenoid 50 and character bar 51 is shown, the others all being similar. The operating plunger 53 of solenoid 50 carries an elongated hasp 52 which is sufficiently long so that manual operation of the keyboard will not be interfered with. A manual cut out switch 81 is provided in the signal input circuit to disable the input circuit at will so that the perforator may be operated in the usual manner without interference from undesired signals. Although a plunger type solenoid is shown, it is to be understood that any suitable type of solenoid may be used.

There is also provided a special character bar 56 which when actuated perforates a special code group (that is, a special series of holes in the tape) indicative of the fact that a signal having an abnormal number of mark impulses (either more or less than the predetermined fixed number) has been received. The error character bar is actuated by a solenoid 55 having an operating plunger 57 and hasp 59 similar to that provided for solenoid 50. Circuits are also provided from the output of certain of the paths through the translator to the error indicating solenoid 55. The purpose of these paths will become apparent later.

A source of local current 58 is provided to actuate the perforator solenoids and to clear the selector relays for reception of the next signal after the tape has been perforated. The circuit by which this is accomplished may be traced through resistor 60, solid ring 61, brushes 62, commutator segments 8 through 12 of commutator ring 63, the winding of relay 65 to ground. Power is also distributed from the same source through commutator segment 13 of commutator ring 63 to the windings of the clearing relay 28.

For the purpose of illustrating the operation of the invention, two assumptions will be made: The source of signal intelligence being received constitutes equal length code signals having seven elemental units, and each transmitted signal consists of three mark elements and four space elements, variations in the transmitted signals being achieved by varying the arrangements of mark and space elements.

Consider that a code combination comprised serially of a mark element, a space element, two mark elements and three space elements is received. The distributor brush 18 will be so synchronized with the transmitted signal that as each element of the signal is, respectively, received a path will be completed to the commutator segments 1 through 7, respectively. The reception of the assumed code signal will cause relays 20, 22 and 23 to operate and lock up through the current flowing through their respective resistors corresponding to resistor 32 of relay 21.

As relays 20, 22 and 23 close, circuits will be completed through their respective resistors corresponding to resistor 34 of relay 21 and thence through the windings of relays 37, 38 and 39. Relay 37, being adjusted to operate upon the current flowing through one of these resistors, will be actuated. Relay 38, which in the assumed case of a three mark element code will be adjusted to operate upon a current flowing through three of these resistors, will also operate. Relay 39, being adjusted to operate only on a current greater than that flowing through relay 38 (in the present case the current flowing through four or more of these resistors), will not operate. The operation of relays 37 and 38 will complete a circuit from the back contact 67 of relay 65, through the contacts 68 of relay 37, the lower contact 69 of relay 38, the upper contact 70 of relay 39 to the tongue of relay 43. Translator relays 44 and 45 will be actuated by means of a current flow from the local power source 30 through the respective resistors of relays 22 and 23 corresponding to resistor 41 of relay 21 and the back contacts 72 and 73 of relays 22 and 23, respectively. The actuation of translator relays 44 and 45 will complete a circuit from the tongue of relay 43, through the translator to output A, solenoid 50 and ground. This path will be maintained through the locking up action of relays 22 and 23 as described previously.

As the distributor brushes continue their rotation, distributor segments 8, 9, 10, 11 and 12 complete a path from local power source 58 to relay 65. The operation of relay 65 connects a local power source 78 to the circuit just described through resistor 79 and contact 67 of relay 65 and causes the operating plunger 53 of solenoid 50 to be actuated, which in turn actuates the character bar 51 through hasp 52 and causes the code group perforations corresponding to the letter A to be perforated.

As the distributor brushes continue their rotation, commutator segment 13 of commutator 63 will conduct current from the local power source 58 to the clearing relay 28 and thence to ground. The operation of clearing relay 28 opens the lock-in circuits of relays 20 through 26, thereby restoring their contacts to their original open positions. The opening of these contacts in turn opens the circuits to the translator relays 43 through 48 and the error relays 37, 38, 39, restoring their contacts to their original positions.

It will be clear that any similar reception of a code signal containing three mark elements will cause a corresponding action to be set up and a path to be completed through the translator so that the proper character bar will be actuated.

If, for any reason, a code signal is received containing less than three mark elements, a similar reaction will take place, with the exception that relay 38 will not be actuated. On the reception of an impulse from local source 58, relay 65 will be actuated and a path will be traced from the source of operating power 78, through contacts 67 of relay 65, contacts 68 of relay 37 and the upper contact 75 of relay 38. Thence, the current will be directed to the error solenoid 55 to ground. The operation of solenoid 55 will cause a code group to be perforated which will indicate that a mutilated signal has been received.

If, for any reason, a code signal is received which contains more than three mark elements, relay 39 will be brought into operation. The operating current may then be traced through the contact 67 of relay 65, contact 68 of relay 37, the lower contact 69 of relay 38 and the lower contact 76 of relay 39. The current will then be conducted to solenoid 55 again causing an error indicating code group to be perforated.

It will be noted that certain groups of three mark elements are not used to represent intelligence. It is, therefore, possible that fading and static may cause reception of impulses which would consist of three mark elements but which would cause the translator pile-ups to complete a path to one of the unused combinations. If the third, fifth and seventh elements of the received code were received as mark impulses and the remaining elements received as spaces such a combination would result. In such case error detecting relays 37 and 38 would be actuated as in the reception of any unmutilated signal and the operating current delivered to the translator. In order that an indication may be given that such a combination was received in error, the unused circuits are connected through line 80 with the error indicating solenoid 55, whereby such reception causes the error indicating code group to be perforated.

It will also be noted that while seven selector relays are used only six translator relays are used. Further, certain of the output circuits of the translator do not pass through the contacts of all of the translator relays, this last arrangement being common practice in translators of this type. Because of this arrangement, it would appear that certain false translations might occur. For instance, if a code signal is received containing four mark elements such as the first four, a path would be established through the translator to the "letter" output. However, the operation of the error detector relay 39, actuated by current through four resistors, will eliminate this possibility. Similarly, if a code group having only 1 and 7 as the mark elements is received, a path would be set up through the translator through to the output Z. However, since error detector relay 38 would not be actuated by such a combination, the operating current will be directed to the error relay. Accordingly, only the reception of unmutilated signals will permit a code group representative of intelligence to be perforated.

What is claimed is:

1. In combination, a perforator, selective means for causing said perforator to perforate a code group in response to the reception of a single unmutilated multi-element code signal containing a predetermined number of mark and space elements, a plurality of code element responsive devices, a plurality of parallel impedance circuits each respectively actuated by one of said responsive devices, and a plurality of error detecting relays actuated under control of currents through said impedance circuits for causing an error-indicating code group to be perforated upon reception of other than said predetermined number of marking elements of said code signal.

2. In combination, a perforator, selective means for causing said perforator to perforate a code group in response to the reception of a single unmutilated multi-element code signal containing a predetermined number of mark and space elements, a plurality of code element responsive devices, a plurality of parallel impedance circuits each respectively actuated by one of said responsive devices, a plurality of error detecting relays actuated under control of currents through said impedance circuits for causing an error-indicating code group to be perforated upon reception of other than said predetermined number of marking elements of said code signal, and means for causing said error-indicating code group to be perforated upon reception of a null code signal having a normal number of marking elements of said code signal in predetermined spaced relationship.

3. In a telegraph reperforating system, a perforator having code group selecting means responsive to a normal predetermined number of marking elements of a uniform-length code signal, a plurality of code element responsive devices, a plurality of parallel impedance circuits each respectively actuated by one of said responsive devices, and a plurality of error indicating relays operable under control of currents through said impedance circuits for causing an error-indicating code group to be perforated upon reception of an abnormal number of said marking elements.

4. In a telegraph reperforating system, a perforator having code group selecting means responsive to a normal predetermined number of marking elements of a uniform-length code signal, a plurality of code element responsive devices, a plurality of parallel impedance circuits each respectively actuated by one of said responsive devices, a plurality of error detecting relays operable under control of currents through said impedance circuits for causing an error-indicating code group to be perforated upon reception of an abnormal number of said marking elements, and means for causing said error-indicating code group to be perforated upon reception of a null code signal having a normal number of marking elements of said code signal in predetermined spaced relationship.

5. In a telegraph reperforating system, code signal receiving apparatus, a perforator having code group selecting means responsive to a normal predetermined number of marking elements of a uniform-length code signal, means including a plurality of de-coding members actuated in response to said signals for controlling the actuation of said code group selecting means, an impedance circuit appropriate to and actuated upon the actuation of each selected de-coding member, all of said impedance circuits being connected in parallel, a relay system in series with said impedance circuits, and means operable under control of said relay system upon reception of an abnormal number of marking elements for causing an error indicating code group to be perforated.

6. In a telegraph reperforating system, code signal receiving apparatus, a perforator having code group selecting means responsive to a normal predetermined number of marking elements of a uniform-length code signal, means including a plurality of de-coding members actuated in response to said signals for controlling the actuation of said code group selecting means, an impedance circuit appropriate to and actuated upon the actuation of each selected de-coding member, all of said impedance circuits being connected in parallel, a relay system in series with said impedance circuits, means operable under control of said relay system upon reception of an abnormal number of marking elements for causing an error indicating code group to be perforated, and means for causing said error-indicating code group to be perforated upon reception of a null code signal having a normal number of marking elements of said code signal in predetermined space relationship.

7. In combination, a source of uniform-length code signals having a normal predetermined number of marking elements, a plurality of mark elements responsive devices, a plurality of parallel impedance circuits each respectively closable by one of said responsive devices, a perforator, selective means actuated by said responsive means for causing said perforator to perforate a code group corresponding to said normal number of marking elements, and a plurality of error detecting relays operable under control of currents through said impedance circuits for causing an error-indicating code group to be perforated upon reception of an abnormal number of said marking elements.

8. In combination, a source of uniform-length code signals having a normal predetermined number of marking elements, a plurality of mark element responsive devices, a plurality of parallel impedance circuits each respectively closable by one of said responsive devices, a perforator, selective means actuated by said responsive means for causing said perforator to perforate a code group corresponding to said normal number of marking elements, a plurality of error detecting relays operable under control of currents through said impedance circuits for causing an error-indicating code group to be perforated upon reception of an abnormal number of said marking elements, and means for causing said error-indicating code group to be perforated upon reception of a null code signal having a normal number of marking elements of said code signal in predetermined spaced relationship.

9. In combination, a perforator, selective means for causing said perforator to perforate a code group in response to the reception of a single unmutilated multi-element code signal containing a predetermined number of mark and space elements, a plurality of code element responsive devices, a plurality of devices for actuating said selective means wherein there is at least one more of said responsive devices than of said selective actuating devices, each of said selective actuating devices being actuated by one of said responsive devices, a plurality of parallel impedance circuits each respectively actuated by one of said responsive devices, and a plurality of error detecting relays actuated under control of currents through said impedance circuits for causing an error-indicating code group to be perforated upon reception of other than said predetermined number of marking elements of said code signal.

10. In combination, a perforator, selective means for causing said perforator to perforate a code group in response to the reception of a single unmutilated multi-element code signal containing a predetermined number of mark and space elements, a plurality of code element responsive devices, a plurality of devices for actuating said selective means wherein there is at least one more of said responsive devices than of said selective actuating devices, each of said selective actuating devices being actuated by one of said responsive devices, a plurality of parallel impedance circuits each respectively actuated by one of said responsive devices, a plurality of error detecting relays actuated under control of currents through said impedance circuits for causing an error-indicating code group to be perforated upon reception of other than said predetermined number of marking elements of said code signal, and means for causing said error-indicating code group to be perforated upon reception of a null code signal having a normal number of marking elements of said code signal in predetermined spaced relationship.

11. In a telegraph perforating system, a perforator having code group selecting means responsive to a normal predetermined number of marking elements of a uniform-length code signal, a plurality of code element responsive devices, a plurality of devices for actuating said selective means wherein there is at least one more of said responsive devices than of said selective actuating devices, each of said selective actuating devices being actuated by one of said responsive devices, a plurality of parallel impedance circuits each respectively actuated by one of said responsive devices, and a plurality of error detecting relays operable under control of currents through said impedance circuits for causing an error-indicating code group to be perforated upon reception of an abnormal number of said marking elements.

12. In a telegraph perforating system, a perforator having code group selecting means responsive to a normal predetermined number of marking elements of a uniform-length code signal, a plurality of code element responsive devices, a plurality of devices for actuating said selective means wherein there is at least one more of said responsive devices than of said selective actuating devices, each of said selective actuating devices being actuated by one of said responsive devices, a plurality of parallel impedance circuits each respectively actuated by one of said responsive devices, a plurality of error detecting relays operable under control of currents through said impedance circuits for causing an error-indicating code group to be perforated upon reception of an abnormal number of marking elements, and means for causing said error-indicating code group to be perforated upon reception of a null code signal having a normal number of marking elements of said code signal in predetermined spaced relationship.

13. In a telegraph perforating system, code signal receiving apparatus, a perforator having code group selecting means responsive to a normal predetermined number of marking elements of a uniform-length code signal, a plurality of devices for actuating said selective means, means including a plurality of de-coding members actuated in response to said signals for controlling the actuation of said code group selecting means wherein there is at least one more of said de-coding members than of said selective actuating means, an impedance circuit appropriate to and actuated upon the actuation of each selected de-coding member, all of said impedance circuits being connected in parallel, a relay system in series with said impedance circuits, and means operable under control of said relay system upon reception of an abnormal number of marking elements for causing an error indicating code group to be perforated.

14. In a telegraph perforating system, code signal receiving apparatus, a perforator having code group selecting means responsive to a normal predetermined number of marking elements of a uniform-length code signal, a plurality of devices for actuating said selective means, means including a plurality of de-coding members actuated in response to said signals for controlling the actuation of said code group selecting means wherein there is at least one more of said de-coding members than of said selective actuating means, an impedance circuit appropriate to and actuated upon the actuation of each selected de-coding member, all of said impedance circuits being connected in parallel, a relay system in series with said impedance circuits, means operable under control of said relay system upon reception of an abnormal number of marking elements for causing an error indicating code group to be perforated, and means for causing said error-indicating code group to be perforated upon reception of a null code signal having a normal number of marking elements of said code signal in predetermined spaced relationship.

15. In combination, a source of uniform-length code signals having a normal predetermined number of marking elements, a perforator, a plurality of mark element responsive devices, selective means for causing said perforator to perforate a code group corresponding to said normal number of marking elements, a plurality of devices for actuating said selective means wherein there is at least one more of said responsive devices than of said selective actuating devices, each of said selective actuating devices being actuated by one of said responsive devices, a plurality of parallel impedance circuits each respectively closable by one of said responsive devices, and a plurality of error detecting relays operable under control of currents through said impedance circuits for causing an error-indicating code group to be perforated upon reception of an abnormal number of said marking elements.

16. In combination, a source of uniform-length code signals having a normal predetermined number of marking elements, a perforator, a plurality of mark element responsive devices, selective means for causing said perforator to perforate a code group corresponding to said normal number of marking elements, a plurality of devices for actuating said selective means wherein there is at least one more of said responsive devices than of said selective actuating devices, each of said selective actuating devices being actuated by one of said responsive devices, a plurality of parallel impedance circuits each respectively closable by one of said responsive devices, a plurality of error detecting relays operable under control of currents through said impedance circuits for causing an error-indicating code group to be perforated upon reception of an abnormal number of said marking elements, and means for causing said error-indicating code group to be perforated upon reception of a normal number of marking elements of said code signal in predetermined spaced relationship.

17. In combination, a perforator, a keyboard coupled to said perforator and comprising a plurality of character bars operable to cause said perforator to perforate code groups corresponding to the characters associated with said character bars, said character bars including an error character bar, actuating mechanisms coupled to said character bars permitting operation thereof in the normal manner and in response to the reception of an incoming code signal selectively, selective means for actuating said character bar actuating mechanisms to cause said perforator to perforate a code group in response to the reception of a single unmutilated multi-element code signal containing a predetermined number of mark and space elements, a plurality of code element responsive devices, a plurality of parallel impedance circuits each respectively actuated by one of said responsive devices and a plurality of error detecting relays actuated under control of currents through said impedance circuits for actuating said error character bar actuating mechanism to cause an error-indicating code group to be perforated upon reception of other than said predetermined number of marking elements of said code signal.

18. In combination, a perforator, a keyboard coupled to said perforator and comprising a plurality of character bars operable to cause said perforator to perforate code groups corresponding to the characters associated with said character bars, said character bars including an error character bar, actuating mechanisms coupled to said character bars permitting operation thereof in the normal manner and in response to the reception of an incoming code signal selectively, selective means for energizing said character bar actuating mechanisms to cause said perforator to perforate a code group in response to the reception of a single unmutilated multi-element code signal containing a predetermined number of mark and space elements, a plurality of code element responsive devices, a plurality of parallel impedance circuits each respectively actuated by one of said responsive devices, a plurality of error detecting relays actuated under control of currents through said impedance circuits for energizing said error character bar actuating mechanism to cause an error-indicating code group to be perforated upon reception of other than said predetermined number of marking elements of said code signal, and means for energizing said error character bar actuating mechanism to cause an error-indicating code group to be perforated upon reception of a null code signal having a normal number of marking elements of said code signal in predetermined spaced relationship.

19. In combination, a source of uniform-length code signals having a normal predetermined number of marking elements, a plurality of mark element responsive devices, a plurality of parallel impedance circuits each respectively closable by one of said responsive devices, a perforator having a keyboard comprising a plurality of character bars operable for causing said perforator to perforate code groups corresponding to the characters associated with said character bars, said character bars including an error-character bar, an actuating magnet coupled to each of said character bars permitting operation thereof in the normal manner and in response to current flow in said magnets selectively, selective means actuated by said responsive means for causing current flow in said magnets in response to said code signals having said normal number of marking elements, a plurality of error detecting relays operable under control of currents through said impedance circuits for causing current flow in the actuating magnet associated with said error-character bar to cause an error indicating code group to be perforated upon reception of an abnormal number of said marking elements, and means disabling said source of code signals to permit operation of the keyboard comprising said character bars in the normal manner.

JAMES A. SPENCER.

No references cited.